United States Patent

[11] 3,617,884

| [72] | Inventors | James A. Bonesho<br>Alexandria, Va.;<br>John Gustave Bollinger, Madison, Wis. |
|---|---|---|
| [21] | Appl. No. | 862,137 |
| [22] | Filed | Aug. 18, 1969 |
| [23] | | Division of Ser. No. 784,283,<br>Dec. 6, 1968, Pat. No. 3,483,951 |
| [45] | Patented | Nov. 2, 1971 |
| [73] | Assignee | Wisconsin Alumni Research Foundation<br>Madison, Wis. |

[54] PHASE ANGLE MEASURING SYSTEM FOR VIBRATION DAMPERS OR THE LIKE
1 Claim, 4 Drawing Figs.

| [52] | U.S. Cl. | 324/83 A |
|---|---|---|
| [51] | Int. Cl. | G01r 25/00 |
| [50] | Field of Search | 324/83, 84;<br>328/133, 155; 329/110; 340/170 |

[56] References Cited
UNITED STATES PATENTS

| 2,838,733 | 6/1958 | Longfellow | 324/83 A |
|---|---|---|---|
| 2,889,473 | 6/1959 | Ingham | 328/155 X |

Primary Examiner—Alfred E. Smith
Attorney—Burmeister, Palmatier & Hamby

ABSTRACT: The disclosed system measures the phase angle between two signals and produces an error or difference signal which changes polarity at an angle of 90° and is a linear function of the phase angle. The system comprises first and second limiter means for deriving square waves of fixed amplitude corresponding to the first and second input signals. The sum and difference of such square waves are derived by adder means and first subtracter means. First and second absolute value means are provided to derive the absolute values of such sum and difference. Second subtracter means are utilized to derive the difference between such absolute values. Means are then provided to derive the mean value of the last mentioned difference. Such means value affords the desired error signal.

SINGLE VARIABLE DAMPER AND MAIN SYSTEMS

Single Variable System

SINGLE VARIABLE DAMPER SCHEMATIC

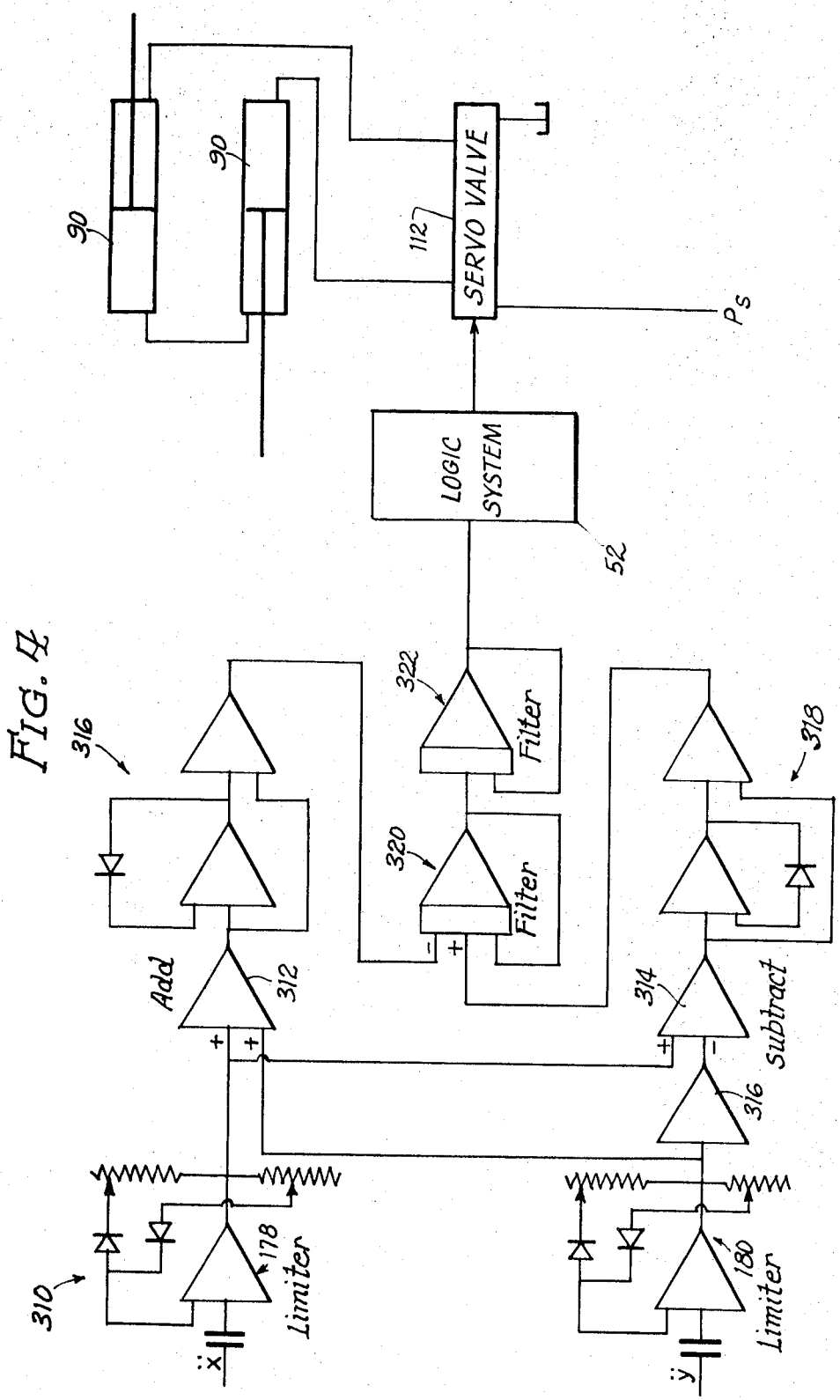

PHASE ANGLE MEASURING SYSTEM FOR VIBRATION DAMPERS OR THE LIKE

This application is a division of the applicants' copending application, Ser. No. 784,283, filed Dec. 6, 1968, now U.S. Pat. No. 3,483,951, issued Dec. 16, 1969 on Self-Optimizing Vibration Dampers, which was a continuation of the applicants' original application, Ser. No. 663,833, filed Aug. 28, 1967.

This invention relates to a phase angle measuring system which will find many applications, but will be described in connection with self-optimizing systems and devices for reducing or damping vibrations in machine tools, buildings, vehicles and the like. In the disclosed vibration damper systems, the phase angle measuring system is employed to measure the phase angle between two vibration signals, one representing the main vibrations to be damped, and the other representing the vibrations of a damper mass. Reference may be made to the above-mentioned patent for the full details of such vibration damper systems.

One object of the present invention is to provide a phase angle measuring system which produces an error or difference signal which changes polarity at an angle of 90° and is a substantially linear function of the phase angle.

A further object is to provide such a system which does not require a multiplier such as those employed in other systems.

Another object is to provide a phase angle measuring system which is highly reliable, yet is relatively simple and inexpensive.

The phase angle measuring system of the present invention preferably comprises first and second limiter means for deriving square waves of fixed amplitude corresponding to first and second input signals. The sum and difference of such square waves are derived by adder means and first subtracter means. First and second absolute value means are employed for deriving the absolute values of such sum and difference. Second subtracter means are then utilized to derive the difference between such absolute values. Finally, means are employed to derive the mean value of the second mentioned difference. Such mean value provides the desired error signal.

Further objects, advantages and features of the present invention will appear from the following description, taken with the accompanying drawings, in which:

FIG. 4 is a schematic diagram of a phase angle measuring system to be described as an illustrative embodiment of the present invention, the measuring system being adapted to be employed with the damper systems of FIGS. 1, 2 and 3.

Figure 1:
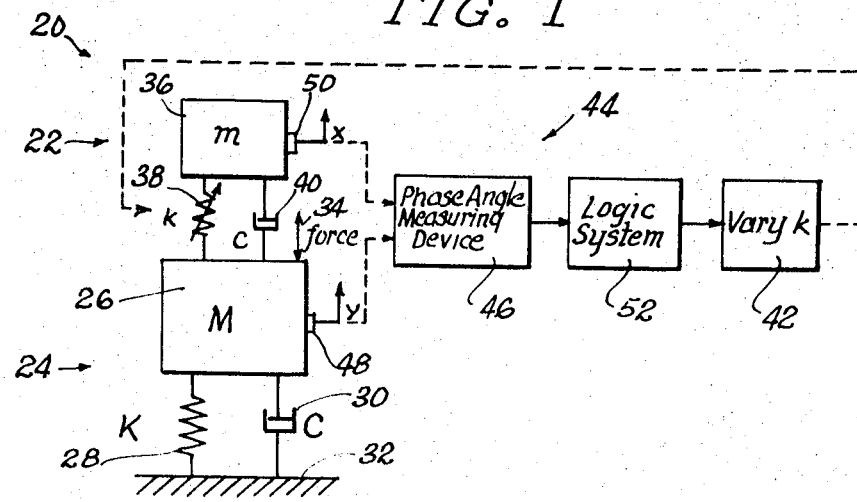
FIG. 1 is a schematic diagram of a self-optimizing damper system, with which the phase angle measuring system of the present invention may be employed.

FIG. 1 constitutes a schematic illustration of a vibratory system 20, comprising a damper system 22 for reducing the vibrations in a main system 24. For purposes of illustration, the main system 24 is represented as comprising a main vibratory body 26 having a mass M. The main vibratory body 26 has a resilient support, represented as a spring 28 with a spring constant K, which is a measure of the stiffness of the resilient support. The damping in the main system 24 is represented as a dashpot or other damping device 30, having a damping coefficient C. The spring means 28 and the damping means 30 are represented as being connected between the main vibratory body 26 and a solid base or foundation 32.

Vibrations in the main system 24 may be produced by the application of an intermittent or cyclic force to the main mass 26. Such force is represented by an arrow 34.

The purpose of the damper system 22 is to minimize the vibrations in the main system 24. The damper system 22 is illustrated as comprising a damper mass or body 36 having a mass m which is substantially less than the main mass M. The damper mass 36 is supported by damper spring means 38, connected between the damper mass 36 and the main mass 26.

The damping in the damper system 22 is represented as a dashpot or other damping device 40. The damper spring 38 has a spring rate $k$, while the damping element 40 has a damping coefficient $c$.

The damper spring 38 is variable so that the stiffness or rate of the spring can be varied while the system is in operation. In this way, the damper system 22 can be tuned to the optimum condition, in which the vibratory energy of the main system 24 is absorbed by the damper system 22, so that the vibrations of the main system 24 will be minimized. Power control means 42 are provided to vary the stiffness of the spring 38. The operation of the control means 42 is governed by a control system 44, which is responsive to the vibrations of the main mass 26 and the damper mass 36. While the ultimate object of the system is to minimize the vibrations of the main mass 26, it has been found that the damper system 22 can best be optimized with reference to the phase angle between the vibrations of the main mass 26 and the damper mass 36. A very close approximation of the optimum condition is achieved by adjusting the spring 38 so that the phase angle is brought to 90°. There is only a negligible error between the condition of the damper system for a phase angle of 90° and the true optimum condition, in which the vibrations of the main mass 26 are at their lowest point. Such error approaches zero as the damping coefficient of the damper system 22 is reduced toward zero. Inasmuch as the damping coefficient of the damping system 22 is normally quite low, there is only a negligible departure from the true optimum in varying the spring 38 so that the phase angle approaches 90°. Moreover, there are distinct advantages in employing the phase angle as the criterion for varying the spring 38. The phase angle provides a criterion which is unambiguous. Thus, if the damper spring 38 is too stiff, the phase angle is always less than 90°. In fact, the phase angle rapidly approaches zero as the spring is made stiffer than the optimum value. When the spring 38 is less stiff than the optimum value, the phase angle is always greater than 90° and rapidly approaches 180°. The phase angle provides a sensitive criterion, in that a small change in the variable spring 38 produces a great change in the phase angle as it moves through 90°. Moreover, it is easy to measure the phase angle and to produce a control signal which will indicate whether the phase angle is greater or less than 90°.

Thus, the illustrated control system 44 comprises measuring means 46 for measuring the phase angle between the vibrations of the main mass 26 and the damper mass 36. The measuring device 46 preferably receives vibration signals from vibration pickups 48 and 50 connected to the main mass 26 and the damper mass 36. Preferably, the measuring device 46 produces a control signal which changes polarity as the phase angle goes through 90°. The magnitude of the control signal is preferably proportional to the departure of the phase angle from 90°. Those skilled in the art will be familiar with various phase angle measuring devices which will produce such control signals. Further details of the measuring device 46 will be described below.

The control signal from the measuring device 46 is supplied to logic means 52 which operate the control means 42 in accordance with the control signal. Thus, the control means 42 may be caused to increase the stiffness of the spring 38 for a control signal of one polarity while decreasing the stiffness for a control signal of the opposite polarity.

Figure 2:
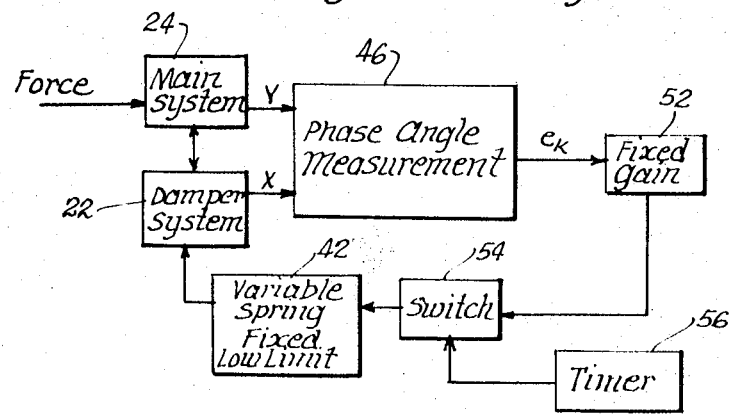
FIG. 2 is a schematic diagram of a slightly modified damper system.

FIG. 2 illustrates a slightly modified control system in which a logic switch or gate 54 is interposed between the logic means 52 and the spring control means 42. The switch 54 is gated or rendered operative at regular intervals by pulses from a timer 56. In this way, the spring is varied incrementally. Each increment of spring variation is followed by a pause, which allows time for transients to die out, so that the damper system 22 achieves a new steady state condition of vibration.

In the systems of FIGS. 1 and 2, the damping coefficient $c$ of the damper system 22 should be as low as feasible, in order to minimize the vibrations of the main system 24 to best advantage. The 90° phase angle criterion approaches complete accuracy as the damping coefficient approaches zero. Moreover, the efficiency of the damping system 22 becomes greater as the damping coefficient is reduced. In this way, a lower minimum of vibration can be achieved in the main system 24.

However, a damping coefficient of zero can never be achieved, because there is always some damping in the damping system 22. Moreover, a small amount of damping is desirable so as to cause the decay of transient conditions in the damper system 22. Without a small amount of damping, the damper system would respond too slowly to changes in the stiffness of the damper spring.

Figure 3:
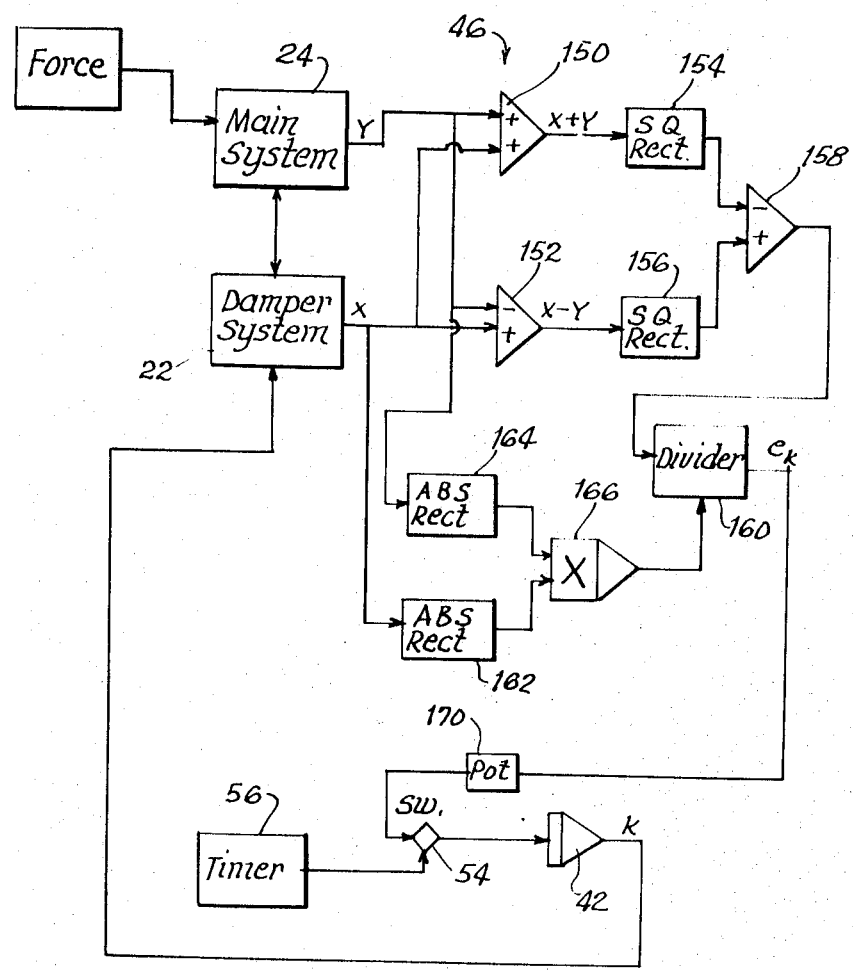
FIG. 3 is a schematic diagram of a self-optimizing damper system which is an elaboration of the system of FIG. 2.

FIG. 3 illustrates a system which is an elaboration of the system of FIG. 2. In particular, the phase angle measurement system 46 is illustrated in greater detail. In the system of FIG. 3, the phase angle error signal $e_k$ is derived by adding and subtracting the vibration signals $x$ and $y$ from the damper system 22 and the main system 24, squaring the sum and difference signals $x+y$ and $x-y$, subtractively combining the squared and rectified signals, and dividing the combined signal by the product of the absolute values of the $x$ and $y$ signals. This system produces an error signal which is proportional to the cosine of the phase angle between the $x$ and $y$ signals. Thus, the error signal changes polarity when the phase angle goes through 90°. The amplitude of the error signal increases rapidly as the phase angle departs from 90°.

This system of measuring the phase angle is known to those skilled in the art. Moreover, a number of other systems for measuring the phase angle are also known and may be employed instead of the system illustrated in FIG. 3.

It will be seen that the phase angle measurement system 46 of FIG. 3 comprises various analog computer components. Thus, the $x$ and $y$ signals are added by an adding amplifier 150, and are subtracted by a subtracting amplifier 152. The sum and difference signals are squared and rectified by squaring and rectifying circuit 154 and 156. The squared and rectified sum signal is subtracted from the squared and rectified difference signal by a subtracting amplifier 158. The output of the amplifier 158 is proportional to the cosine of the phase angle, but it is also proportional to the product of the absolute amplitude of the $x$ and $y$ signals. Thus, the output of the amplifier 158 is highly sensitive to variations of the amplitudes. To eliminate this amplitude sensitivity, the output of the amplifier 158 is passed through a dividing circuit 160, which divides the partially processed error signal by the product of the absolute values of the $x$ and $y$ signals. The absolute values are derived by employing absolute value and rectifier circuits 162 and 164, to which the $x$ and $y$ signals are supplied. The signals from the absolute value and rectifier circuits 162 and 164 are supplied to a multiplier 166, so as to derive the product. The product signal is supplied to the divider 160, which divides the product into the partially processed error signal from the subtracting amplifier 158. The result is the phase angle error signal $e_k$, which is a function of the cosine of the phase angle, and is substantially independent of the amplitudes of the $x$ and $y$ signals.

The level of the error signal is adjusted by a potentiometer 170, and the signal is then supplied to the logic switch 54, the same as in FIG. 2. The switch 54 is activated cyclically by the timer 56. The output of the switch 54 operates the control device 42, which may comprise a servo valve for supplying hydraulic fluid to hydraulic cylinders 90, shown in FIG. 4.

FIG. 4 illustrates a modified control system 310 which employs high gain limiting amplifiers 178 and 180 to convert the damper vibration signal $x$ and the main vibration signal $y$ into square waves of fixed amplitude. The system 310 of FIG. 4 comprises means for deriving the sum and difference of the square waves. The absolute value of the sum is then subtracted from the absolute value of the difference, to produce a combined signal having a mean value which is a linear function of the phase angle between the $x$ and $y$ signals. The mean value changes polarity at 90°.

Thus, the system 310 of FIG. 4 comprises an adding amplifier 312 which adds the square waves from the limiters 178 and 180. The outputs of the limiters 178 and 180 are fed directly to the adding amplifier 312. The $x$ and $y$ square waves are combined subtractively by a second amplifier 314. A phase inverting amplifier 316 is connected between the output of the limiter 180 and amplifier 314 to produce the subtraction.

The sum and difference signals from the amplifiers 312 and 314 are fed through absolute value amplifiers 316 and 318. The resulting absolute value signals are combined subtractively at the input of a filtering amplifier 320. Thus, the absolute value of the sum is subtracted from the absolute value of the difference. A second filtering amplifier 322 is connected to the output of the filtering amplifier 320. The amplifiers 320 and 322 derive the mean value of the combined absolute value signal. Thus the error signal $e_k$ appears at the output of the filtering amplifier 322.

The phase angle measuring system of FIG. 4 derives an error signal which is a linear function of the phase angle. Moreover, the error signal changes polarity at 90°. The system of FIG. 16 is advantageous, because it does not require any multiplier. The components of the system of FIG. 4 are all inexpensive. On the other hand, multipliers are relatively expensive. Thus, the cost of the system of FIG. 4 is considerably less than that of a system employing a multiplier. Moreover, the system of FIG. 4 is more reliable.

The spring rate of the damper may be varied either incrementally or steadily. In the system of FIGS. 3 and 3, the spring rate is varied incrementally. In the system 310 of FIG. 4, on the other hand, the spring rate is varied steadily or continuously, in response to the error signal $e_k$. Thus, the error signal from the output of the filtering amplifier 322 is fed through the logic system 52 to the servo valve 112, which controls the hydraulic cylinders 90, arranged to control the spring rate, without the use of any timer of switching device. The servo valve 112 supplies hydraulic fluid to one of the cylinders 90 when the error signal $e_k$ is positive, and to the other cylinder 90 when the error signal is negative. The spring rate is increased when the phase angle is greater than 90°, and is decreased when the phase angle is less than 90°.

We claim:

1. A system for measuring the phase angle between first and second signals, comprising first and second limiter means for receiving the first and second signals and deriving square waves of fixed amplitude corresponding thereto, adder means for deriving the sum of said square waves, first subtractor means for deriving the difference between said square waves, first and second absolute value means for deriving the absolute values of said sum and difference, second subtractor means for deriving the difference between the absolute value of said first mentioned difference and the absolute value of said sum, and means for deriving the mean value of said second mentioned difference, said mean value providing a control signal which changes polarity at a phase angle of 90° and is a linear function of the phase angle.

* * * * *